United States Patent [19]

Hossfield et al.

[11] Patent Number: 5,179,905
[45] Date of Patent: Jan. 19, 1993

[54] ADAPTIVE AUTOPILOT

[75] Inventors: Robin C. Hossfield, Medway; Joseph R. Adamski, Sudbury, both of Mass.

[73] Assignee: Raytheon Company, Lexington, Mass.

[21] Appl. No.: 794,752

[22] Filed: Nov. 19, 1991

[51] Int. Cl.[5] .......................................... B63H 25/04
[52] U.S. Cl. ................................ 114/144 E; 318/588
[58] Field of Search ............... 114/144 R, 144 E, 122; 244/175, 195; 318/588; 364/457

[56] References Cited

U.S. PATENT DOCUMENTS

| | | | |
|---|---|---|---|
| 3,505,577 | 4/1970 | Hirokawa | 318/588 |
| 3,604,907 | 9/1971 | Wesner | 318/588 X |
| 4,074,648 | 2/1978 | Reid et al. | 114/144 E |
| 4,799,163 | 1/1989 | Wesner | 114/144 E |

FOREIGN PATENT DOCUMENTS 1756679 4/1970 Fed. Rep. of Germany ... 114/144 E

*Primary Examiner*—Sherman Basinger

*Attorney, Agent, or Firm*—Judith A. Caplan; Richard M. Sharkansky

[57] ABSTRACT

A marine autopilot having adaptive gain control. The autopilot operates under a proportional plus derivative (PD) control law during course change operation (i.e. when the difference between a desired course and the actual vessel heading is greater than a predetermined value) and a proportional plus integral plus derivative (PID) control law during course keeping operation (i.e. when the difference between the desired course and the actual heading is less than the predetermined value). A gain value associated with the derivative term of the PID control law is adaptively controlled as a function of the roll frequency of the vessel. More particularly, since the damping provided by the derivative term is ineffectual in maintaining the desired course when the vessel is heading into the seas (i.e. when the roll frequency is greater than a predetermined value), the derivative term is nulled in such conditions. In this way, ineffectual rudder movement and thus wear on the rudder and associated drive apparatus is reduced.

4 Claims, 7 Drawing Sheets

ADAPTIVE AUTOPILOT

BACKGROUND OF THE INVENTION

This invention relates generally to autopilots and more particularly relates to a marine autopilot having an adaptive gain feature.

As is known in the art, a marine autopilot is used to maintain a ship, or vessel on a fixed course while the vessel encounters environmental variations such as changes in wind speed and direction, and changes in sea conditions. Preferably, the vessel course is maintained with minimum intervention by the operator of the vessel. In particular, the autopilot adjusts the position of the vessel's rudder in order to compensate for course deviations caused by changes in, inter alia, waves, wind, currents, and vessel speed.

Some marine autopilots use a proportional plus integral plus derivative (PID) control law to maintain the vessel on a desired course (i.e. during course keeping operation) and a proportional plus derivative (PD) control law to change the course of the vessel (i.e. during course change operation). Such an autopilot provides an output signal, hereinafter referred to as a rudder control signal, which corresponds to a desired change in the position of the rudder. During course keeping operation, the rudder control signal is proportional to the summation of the following terms: an error signal (i.e. the difference between a desired course and the actual instantaneous vessel heading), the time integral of the error signal, and the time rate of change of the error signal. Whereas, during course change operation, the rudder control signal is proportional to the summation of the error signal and the time rate of change of the error signal.

More particularly, each term of the conventional PID and PD control laws has a gain value associated therewith. The gain value associated with the error signal may be referred to generally as a proportional gain value, the gain value associated with the time integral of the error signal may be referred to generally as a rudder bias value, and that associated with the time rate of change, or derivative of the error signal may be referred to generally as a counter rudder value. Thus, during course keeping operation for example, the rudder control signal (i.e. the course keeping rudder order signal) is equivalent to $K_p e(t) + K_d \dot{e}(t) + K_i \int e(t) dt$, where $\dot{e}(t)$ is the error signal, $K_p$ is the proportional gain value, $K_i$ is the trim value, and $K_d$ is the counter rudder value.

In such a control system, the proportional term (i.e. $K_p e(t)$) provides rudder movement proportional to the error signal. The derivative term (i.e. $K_d \dot{e}(t)$) provides damping in the sense that once the vessel yaws, the derivative term provides resistance to such motion, or angular velocity. In this way, the derivative term reduces overshoot of the vessel past the desired course. The integral term (i.e. $K_i \int e(t) dt$) provides compensation for low frequency disturbances, such as wind, by providing a bias on the rudder position to offset the effect of such disturbances. Generally, the rudder control signal provided during course change operation (i.e. course change rudder order signal) is as described above with the exception that the integral term (i.e. $K_i \int e(t) dt$) is nulled, or excluded, thus resulting in proportional plus derivative control.

As is also known in the art, autopilots often include manual adjustment capabilities for modifying the various gain values described above, as well as other control system parameters. For example, autopilots may include a manually adjustable counter rudder gain value feature with which the operator of the vessel can adjust the counter rudder gain value in order to correspondingly adjust the resistance of the vessel to angular velocity. The capability of adjusting the counter rudder gain value is desirable since, when the vessel is heading into the waves, some amount of yawing is unavoidable. In other words, performance of the autopilot will no be notably improved by resisting the angular velocity of the vessel in such conditions. However, wear on the rudder and associated drive apparatus can be reduced by reducing the counter rudder gain value in such conditions.

However, manual adjustments somewhat defeat a primary purpose of an autopilot; namely, to maintain a fixed vessel course with minimal operator intervention. Further, such adjustments are not trivial and may be difficult for one unskilled or inexperienced in boating and/or autopilot operation. Thus, although the basis for providing a manual counter rudder gain value adjustment feature is to improve the efficiency of autopilot performance or more particularly, to reduce wear on the rudder and associated drive apparatus by reducing ineffectual rudder motion, such rudder efficiency may actually be degraded by incorrect or excessive adjustments.

SUMMARY OF THE INVENTION

With the foregoing background in mind, it is an object of the present invention to provide a marine autopilot having an adaptive gain feature.

A further object is to provide a marine autopilot with an adaptive counter rudder gain value feature.

A still further object of the present invention is to automatically adjust the counter rudder gain value as a function of the roll frequency of the vessel.

These and other objects of the present invention are provided generally by a marine autopilot, for use on a vessel having a rudder and a source of an actual vessel heading signal. The autopilot includes an operator actuable control for providing a signal corresponding to a desired vessel course and a course keeping circuit for generating a course keeping signal to maintain the vessel on the desired course. The autopilot further includes means coupled to the vessel for sensing the frequency of the roll of the vessel and generating a roll frequency scheduling signal and adjustment means for adjusting the course keeping signal in response to said roll frequency scheduling signal.

With this arrangement, the course keeping signal is a function of the vessel's roll frequency. More particularly in the preferred embodiment, the course keeping signal is provided by a proportional plus integral plus derivative controller and the adjusting means modifies the gain value associated with the derivative term of the control law. Specifically, the derivative term is decreased, or nulled, when the roll frequency is higher than a predetermined value and is unchanged when the roll frequency is below the predetermined value. In other words, when the disturbances in the vessel's heading occur at a relatively high frequency, such as when the vessel is heading into the waves, the derivative term is eliminated. This arrangement is desirable since, under such operating conditions, the rudder cannot be moved fast enough to compensate for the disturbances in order to keep the vessel on the desired course. However, an attempt to do so may result in unnecessary wear on the rudder and associated drive apparatus.

BRIEF DESCRIPTION OF THE DRAWINGS

The foregoing features of this invention, as well as the invention itself, may be more fully understood from the following detailed description of the drawings in which.

DESCRIPTION OF THE PREFERRED EMBODIMENTS

Figure 1:
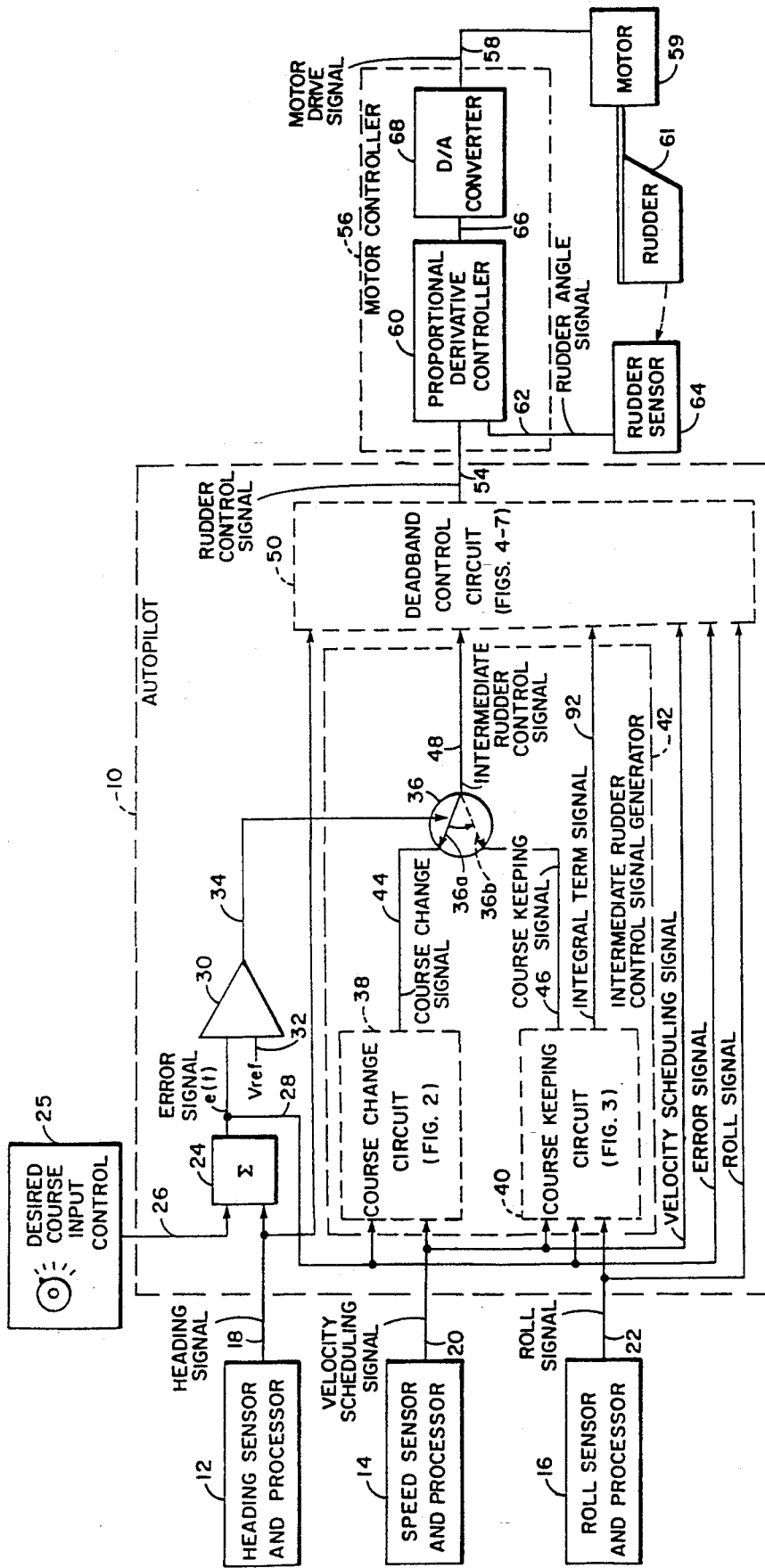
FIG. 1 is a simplified block diagram of an adaptive autopilot in accordance with the present invention.

Referring now to FIG. 1, an autopilot 10 is coupled to a heading sensor and processor unit 12, a speed sensor and processor unit 14, and a roll sensor and processor unit 16. The autopilot 10 is adapted for use on a vessel (not shown), for example a marine vessel having a rudder 61. The heading sensor and processor unit 12 is coupled to the vessel and provides a heading signal, here carried by signal line 18, to autopilot 10. Similarly, speed sensor and processor unit 14 is coupled to the vessel and provides a velocity scheduling signal to autopilot 10 carried by signal line 20 as will be described. Roll sensor and processor unit 16, also coupled to the vessel, provides a roll signal to autopilot 10 carried by signal line 22, as shown. More particularly, heading signal line 18 carries a signal representing the actual heading of the vessel. The velocity scheduling signal is related to the speed of the vessel over water and the roll signal represents the frequency and magnitude of the angle of the roll of the vessel.

Here, heading sensor and processor unit 12 includes a flux gate compass. More particularly, an INI-100 compass manufactured by International Navigation, Inc. of Boca Raton, Fla. and having a five Hertz sampling rate is used. Note however that other compasses, or even a Loran or GPS device, may alternatively be used. Also, it may be desirable to use two such devices, such as a Loran and a compass, in order to provide heading signal redundancy. The heading sensor and processor unit 12 may also include a filter in order to reduce the effect of noise on the autopilot 10 operation introduced by the compass. Here, the heading signal samples, and more particularly five samples per second, are provided by the compass to a microprocessor (not shown) which rejects any signal sample that deviates from the previous sample by more than twenty degrees. If a signal sample is rejected, the previous heading signal sample replaces the rejected sample. Other filtering techniques, such as Kalman filtering, may additionally or alternatively be used. Here, a 68HC11 microprocessor sold by Motorola, Inc. of Shaumburg, Ill. is used, but any conventional microprocessor is suitable.

The speed sensor and processor unit 14 may comprise a paddle wheel sensor, a Loran, or GPS device. Here, a paddle wheel sensor is used to provide a signal related to the vessel speed over water. The speed sensor and processor unit 14 may also include a filter in order to reduce the effect of noise on the autopilot 10 operation introduced by the paddle wheel sensor, such as a "backward differences" filtering technique as described in a book entitled "Automatic Tuning of PID Controllers" authored by K. J. Aström and T. Hägglund. Again, speed signal redundancy may be provided by using more than one speed indicating device, such as a Loran or GPS device in addition to a paddle wheel sensor.

The speed sensor and processor unit 14 also includes a velocity scheduling portion which provides the velocity scheduling signal of line 20. More particularly, the velocity scheduling signal of line 20 is related to the speed of the vessel and, specifically, such velocity scheduling signal is inversely proportional to the vessel speed. The velocity scheduling portion of unit 14 includes a look-up table containing a velocity scheduling signal value corresponding to values of vessel speed. In other words, in response to the speed related signal provided by the paddle wheel sensor and filtered as described above, a velocity scheduling value is provided o velocity scheduling signal line 20. For example, if the vessel speed is seven knots, the velocity scheduling signal of line 20 may have a value of one; whereas, if the vessel speed is eleven knots, the signal of line 20 may have a value of 0.5. The actual look-up table values (i.e. the values of the velocity scheduling signal corresponding to values of vessel speed) are a function of the vessel's characteristics, such as hull shape and weight.

The roll sensor and processor unit 16 here, includes an "AccuStar II" dual axis clinometer manufactured by Lucas Sensing Systems of Phoenix, Arizona. The unit 16 here, also includes an analog to digital converter for digitizing the analog output signal of the clinometer. Furthermore, a suitable filter may be provided in the roll sensor and processor unit 16 in order to reduce the effect of noise on the autopilot 10 operation introduced by the clinometer. Here, a third order Butterworth digital low-pass filter is used to process the digitized clinometer output signal in order to provide the roll signal. The roll signal thus provided is carried by signal line 22 to autopilot 10, as shown.

In operation of autopilot 10, the operator, or helmsmen of the vessel actuates a desired course input control 25 to indicate a desired course for the vessel. More particularly, signal line 26 carries a signal corresponding to the desired vessel course. Heading signal line 18 and desired course signal line 26 are coupled to a summing circuit 24, as shown, for providing an error signal e(t) corresponding to the deviation or difference between the desired course and the actual heading. Here, the error signal e(t) is not permitted to exceed, for example thirty degrees. The benefit of this error signal limiting feature is that since the error signal is used to compute the desired rudder position, or angle and hence the angular velocity with which the vessel moves as will be described below, by limiting the error signal, the angular velocity of the vessel is effectively limited.

Error signal line 28 is coupled to an input of a comparator circuit 30. A reference voltage $V_{ref}$ is coupled to a second input of the comparator circuit 30 by signal line 32, as shown. An output signal line 34 of comparator circuit 30 carries a logic signal indicative of the level of the error signal e(t) relative to the reference voltage $V_{ref}$. More particularly, if the error signal e(t) is greater in value than the reference voltage $V_{ref}$, the logic signal of output signal line 34 is in a first logic state. However, if the error signal e(t) is less than the reference voltage $V_{ref}$, the logic signal of line 34 is in a second logic state. Logic signal line 34 is coupled to a switch 36 and controls the position thereof, as will be described below. Suffice it here to say that when logic signal line 34 is in the first logic state, switch 36 is in a first position 36a and when logic signal line 34 is in the second logic state, switch 36 is in a second position 36b.

Error signal line 28, is further coupled to means 42 responsive to the error signal for generating an intermediate rudder control signal on line 48, or an intermediate rudder control signal generator 42. More particularly, intermediate rudder control signal generator 42 includes a course change circuit 38 and a course keeping circuit 40, as shown, to which error signal line 28 is coupled. Also coupled to the course change circuit 38 and the course keeping circuit 40 is the velocity scheduling signal line 20. The operation of course change circuit 38 will be described in conjunction with FIG. 2 and that of course keeping circuit 40 will be described in conjunction with FIG. 3. Suffice it here to say that in response to the error signal e(t) and the vessel scheduling signal, course change circuit 38 generates a course change signal at an output thereof, carried by signal line 44. Course keeping circuit 40 is further fed by the roll signal line 22, as shown. In response to the error signal e(t), the velocity scheduling signal, and the roll signal, course keeping circuit 40 generates a course keeping signal at an output thereof, carried by signal line 46.

More particularly, the course change signal line 44 and the course keeping signal line 46 are coupled to switch 36, as shown. Switch 36 is further coupled to an intermediate rudder control signal line 48, as shown. When switch 36 is disposed in position 36a, the course change signal line 44 is coupled to the intermediate rudder control signal line 48. When switch 36 is in position 36b, the course keeping signal line 46 is coupled to the intermediate rudder control signal line 48. Thus, when the logic signal carried by line 34 is in the first logic state, intermediate rudder control signal line 48 is coupled to course change signal line 44; whereas, when the logic signal of line 34 is in the second logic state, the course keeping signal line 46 is coupled to intermediate rudder control signal line 48. In this way, the magnitude of the error signal e(t) governs which of signal lines 44 and 46 provides the intermediate rudder control signal of line 48. Stated differently, when the error signal e(t) is greater than the reference voltage $V_{ref}$, the intermediate rudder control signal of line 48 is provided by the course change signal of line 44. Whereas, when the error signal e(t) is less than the reference voltage $V_{ref}$, the intermediate rudder control signal of line 48 is provided by the course keeping signal of line 46. Here, the intermediate rudder control signal of line 48 is updated ten times per second. Also, if the intermediate rudder control signal is being provided by the course change signal and the error signal e(t) has not improved (i.e. decreased) within fifteen seconds, then the switch 36 is disposed in position 36b so that the intermediate rudder control signal is provided by the course keeping signal.

Intermediate rudder control signal line 48 is coupled to a deadband control circuit 50, as shown. Also coupled to deadband control circuit 50 is the heading signal line 18, the error signal line 28, the velocity scheduling signal line 20, and the roll signal line 22. A signal generated by course keeping circuit 40, referred to hereinafter as the integral term signal and carried by signal line 92, is also coupled to the deadband control circuit 50, as shown. In response to the above-mentioned signal lines coupled to deadband control circuit 50, a rudder control signal is provided at an output of circuit 50 and is carried by signal line 54. The manner of providing the rudder control signal of line 54 will be described below in conjunction with FIGS. 4-7. Suffice it here to say that when the intermediate rudder control signal of line 48 is greater than a deadband threshold signal, or more particularly is outside of a deadband range defined by such deadband threshold signal, the rudder control signal of line 54 is set equal to the intermediate rudder control signal of line 48. However, when the intermediate rudder control signal of line 48 is within such deadband range, the rudder control signal of line 54 is set equal to the integral term signal of line 92, as will be described.

The rudder control signal provides the output signal of autopilot 10, via signal line 54, and is coupled to a motor controller 56, as shown. In response to inter alia the rudder control signal, motor controller 56 provides a motor drive signal at an output thereof carried by line 58. The motor drive signal line 58 is further coupled to a motor 59, the operation of which controls the position of the rudder 61.

More particularly, the rudder control signal line 54 is coupled to a proportional plus derivative controller 60 of motor controller 56. Also coupled to proportional-derivative controller 60 is a rudder angle signal line 62, as shown. Specifically, a rudder sensor unit 64 is coupled to the rudder 61 and generates the rudder angle signal of line 62 in response to the position of the rudder 61. Here, rudder sensor unit 64 is a potentiometer. Proportional plus derivative controller 60 provides a digital output signal, via signal line 66, representative of the speed and direction with which the rudder 61 should move to maintain or change the vessel to the desired course. More particularly, consecutive samples of the rudder control signal of line 54 are stored in a memory device. Here, such consecutive samples are separated in time by approximately 0.1 seconds. The controller 60 computes the difference between two consecutive samples and the difference thus provided is divided by 0.1 seconds in order to provide a signal hereinafter referred to as the motor controller derivative term signal. Also within the controller 60, the rudder angle signal is subtracted from the rudder control signal, the latter being interpolated from consecutive samples of the rudder control signal of line 54 at a rate of 250 cycles/second. The difference thus provided may be multiplied by a gain value to provide a signal, hereinafter referred to as the motor controller proportional term signal. The motor controller derivative and proportional term signals are then added to provide the output signal of proportional plus derivative controller 60 via signal line 66.

Signal line 66 is coupled to a digital-to-analog converter 68 which provides an analog replica of the digital signal of line 66 at an output thereof. The analog signal output of line 58 is referred to as the motor drive signal and is fed to the rudder motor 59 as mentioned above.

Figure 2:
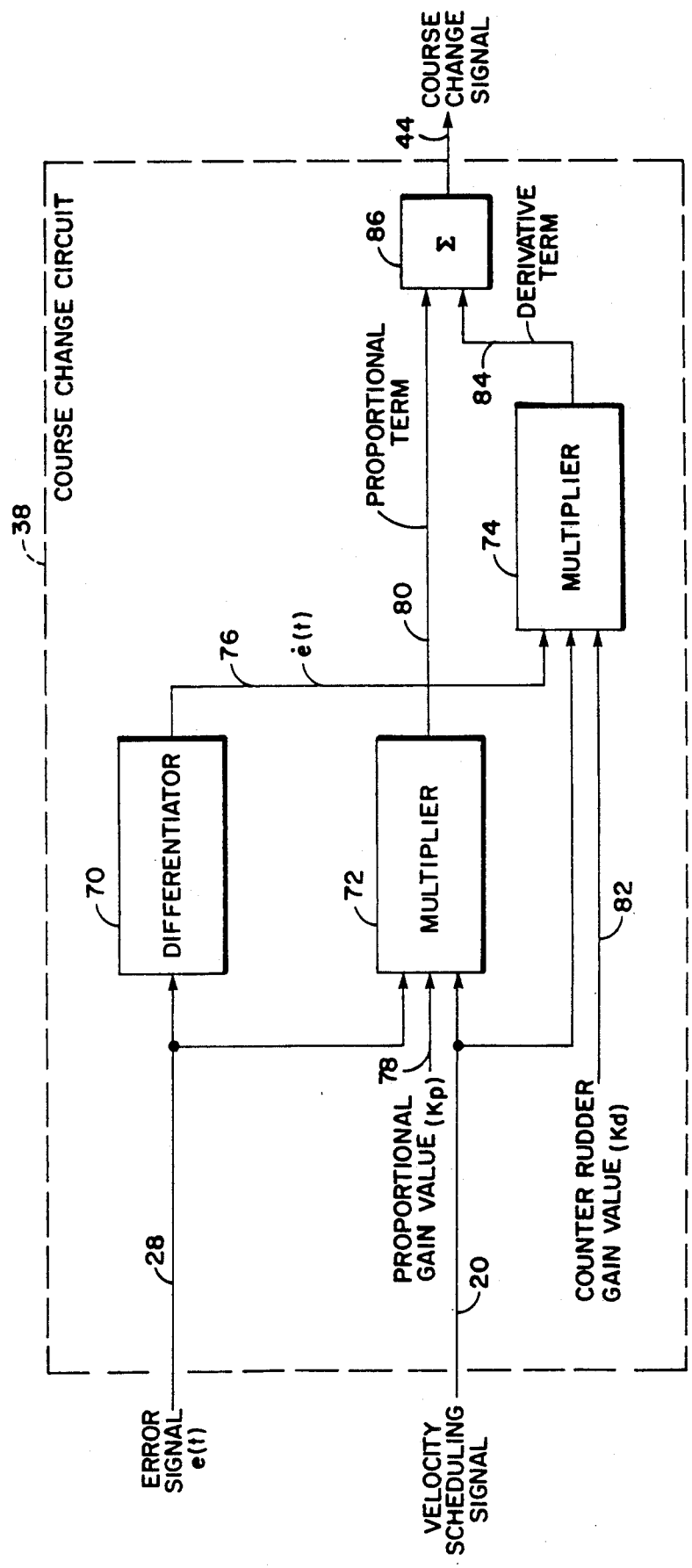
FIG. 2 is a block diagram of the course change circuit of the autopilot of FIG. 1.

Referring now to FIG. 2, the course change circuit 38 provides the course change signal of line 44 at an output thereof, as shown. As mentioned above, when the error signal e(t) is greater than the reference voltage $V_{ref}$, such course change signal of line 44 provides the intermediate rudder control signal of line 48 (FIG. 1). In other words, course change circuit 38 governs the position of the vessel's rudder 61 when the error signal e(t) is greater than the reference voltage $V_{ref}$.

Here, course change circuit 38 is a proportional plus derivative controller. More particularly, error signal line 28 is coupled to a differentiator 70 and to a multiplier 72. Also coupled to multiplier 72 and to a second multiplier 74 is the velocity scheduling signal line 20. Differentiator 70 provides an output signal, carried by signal line 76, corresponding to the time rate of change of the error signal e(t) (i.e. ė(t)). Such time rate of change, or derivative, of the error signal may be filtered by any known technique such as a "backward differences" technique mentioned above and is coupled to multiplier 74, as shown.

Multiplier 72 has a signal line 78 carrying a proportional gain value $K_p$ coupled thereto. Multiplier 72 multiplies the error signal e(t) by the proportional gain value $K_p$ and the velocity scheduling signal of line 20. The product thus computed provides a signal, carried by signal line 80, and referred hereinafter as the proportional term signal. The proportional gain constant $K_p$ is a function of the vessel's characteristics, such as weight and hull shape and, here, is determined at cruising speed when the autopilot 10 is installed. For example, when autopilot 10 is installed on a thirty-five foot, semi-displacement, single propeller vessel, the cruising speed is approximately seven knots and the proportional gain value is approximately 0.25.

Multiplier 74 multiplies the derivative ė(t) of the error signal carried by line 76 with the velocity scheduling signal of line 20 and further with a counter rudder gain value $K_d$ carried by signal line 82, as shown. Here, like the proportional gain value $K_p$, the counter rudder gain value $K_d$ is determined at cruising speed when the autopilot 10 is installed. For example, on the above-described boat, the counter rudder gain value is $K_d$ is approximately 0.25. The product thus provided, or the output of multiplier 74, is carried by signal line 84 and will hereinafter be referred to as the derivative term signal.

Signal lines 80 and 84, carrying the proportional term signal and the derivative term signal respectively, are coupled to inputs of a summing circuit 86 as shown, the output of which provides the course change signal of line 44 (FIG. 1). In other words, the course change signal is provided by the summation of the proportional term signal of line 80 and the derivative term signal of line 84.

Figure 3:
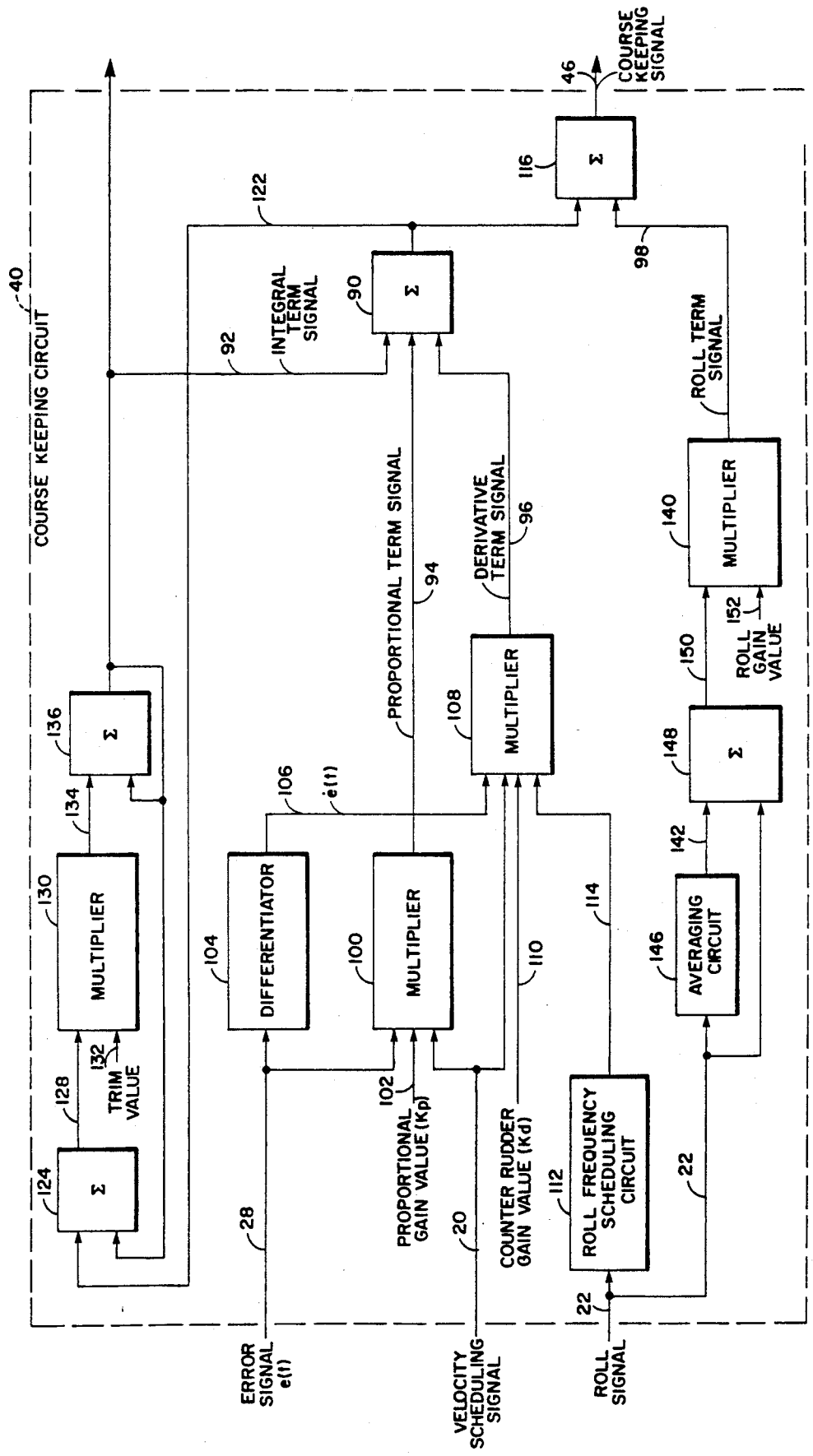
FIG. 3 is a block diagram of the course keeping circuit of the autopilot of FIG. 1.

Referring now to FIG. 3, the course keeping circuit 40 is shown. Coupled to course keeping circuit 40 is the error signal line 28, the velocity scheduling signal line 20, and the roll signal line 22. Course keeping circuit 40 provides, at an output thereof, the course keeping signal of line 46. More particularly, the course keeping signal of line 46 is generated at an output of a summing circuit 116 in response to input signal lines 122 and 98 and signal line 122 is generated at an output of a summing circuit 90 in response to input signal lines 92, 94, and 96. Signal line 92 carries a signal proportional to the time integral of the error signal, and will hereinafter be referred to as the integral term signal line 92. Signal line 94 carries a signal proportional to the error signal and will thus be referred to as the proportional term signal line 94. Signal line 96 carries a signal proportional to the time rate of change, or derivative, of the error signal and will be referred to as the derivative term signal line 96. Signal line 98 carries a signal proportional to the roll angle of the vessel and will be referred to as the roll term signal line 98. The way in which each of the above-referenced signals is generated will now be described.

The proportional term signal carried by line 94 is equivalent to the proportional term signal carried by signal line 80 of course change circuit 38 (FIG. 2). More particularly, a multiplier 100 is fed by error signal line 28 and velocity scheduling signal line 20. Multiplier 100 is further fed by a signal line 102 carrying a signal representing the proportional gain value $K_p$. Multiplier 100 multiplies the error signal e(t) with the proportional gain value $K_p$ and the velocity scheduling signal of line 20 to provide the proportional term signal of line 94.

Error signal line 28 is also coupled to a differentiator 104, as shown. The output of differentiator 104 is provided by signal line 106 and corresponds to the time rate of change, or the derivative ė(t), of the error signal. Signal line 106 is coupled to a multiplier circuit 108, as shown. Also coupled to multiplier 108 is the velocity scheduling signal line 20 and a counter rudder gain value $K_d$ via signal line 110. The counter rudder gain value $K_d$ is, here, equivalent to that of signal line 82 (FIG. 2). In addition to the above-mentioned inputs to multiplier 108, such inputs being equivalent to those of multiplier 74 (FIG. 2), multiplier 108 has a fourth input provided by a roll frequency scheduling circuit 112. More particularly, the roll frequency scheduling circuit 112 provides a roll frequency scheduling signal to multiplier 108 via signal line 114, as shown, for adjusting the course keeping signal of line 46 as will be described. Multiplier 108 multiplies the derivative ė(t) of the error signal of line 106, the velocity scheduling signal of line 20, the counter rudder gain value $K_d$ of line 110, and the roll frequency scheduling signal of line 114 to generate an output signal via line 96. In other words, such multiplier 108 provides a signal proportional to the derivative of the error signal (i.e. the derivative term signal).

As mentioned, roll frequency scheduling circuit 112 provides a roll frequency scheduling signal via signal line 114 which is used by multiplier 108 to generate the derivative term signal of line 96. More particularly, the roll frequency scheduling circuit 112 is fed by the roll signal line 22, as shown. In response to the frequency of the vessel's roll, the roll frequency scheduling circuit 112 generates a roll frequency scheduling signal having a value between zero and one on signal line 114. The roll frequency scheduling signal thus modifies the derivative term signal of line 96 as a function of the roll frequency of the vessel. When the vessel is in following seas, as determined by the roll frequency being below a first predetermined value, such as 0.25 Hertz, the roll frequency scheduling signal has a value of one; whereas, when the vessel is heading into the seas, as determined by the roll frequency being above a second predetermined value, such as 0.45 Hertz, the roll frequency scheduling signal has a value of zero. Furthermore, for values of roll frequency between the first and second predetermined values, the corresponding value of the roll frequency scheduling signal is, here, provided by linear interpolation. With this arrangement, the derivative term signal of line 96 is nulled, or set to zero, when the vessel is heading into the seas and is equal to the product of the derivative e(t) of the error signal, the velocity scheduling signal of line 20, and the counter rudder gain value $K_d$ in following seas. As mentioned above, the derivative term signal of line 96 provides system damping in the sense that it provides resistance to the vessel's angular velocity. While the damping effect of the derivative term is desirable in following sea conditions in order to prevent overshoot of the vessel relative to the desired course, when the vessel is heading into the seas, the damping thus provided is ineffective. In other words, since disturbances in the vessel's heading tend to occur at a relatively high frequency when the vessel is heading into the waves, or seas, the damping provided by the derivative term signal does relatively little to keep the vessel on the desired course. Thus, since the effect of the derivative term is negligible in such conditions, and moreover, due to the wear on the rudder 61 and associated drive apparatus caused by ineffectual movement thereof, the derivative term signal is eliminated, or nulled when the vessel is heading into the seas.

Note that the roll frequency scheduling circuit 112 is not used during course change operation (FIG. 2). This is simply due to the fact that during course changes, the boat will roll. Thus, nulling the derivative term signal when the roll is above the predetermined value (i.e. as can be achieved with circuit 112) would tend to null the derivative term continuously during course change operation.

The integral term signal of line 92 is provided at an output of a summing circuit 136. More particularly, a first summing circuit 124 has a first input provided by signal line 122. As mentioned above, signal line 122 is provided at the output of summing circuit 90 and is equivalent to the summation of the proportional term signal of line 94, the derivative term signal of line 96, and the integral term signal of line 92. A second input to summing circuit 124 is provided by the integral term signal of line 92, as shown. More particularly however, the signal provided by line 92 to an input of summer 124 represents a sample of the integral term signal taken at, or corresponding to, time t−1. Note that the same signal (i.e. representing a sample at time t−1) is provided at an input to summing circuit 136, by signal line 92. Whereas, signal line 92 as coupled to an input of summing circuit 90 and as coupled to deadband control circuit 50 (FIG. 1) represents a sample of the integral term signal taken at, or corresponding 40, time t. In other words, designating the integral term signal as I(t), I(t−1) is coupled to an input of summing circuits 124 and 136, whereas I(t) is coupled to summing circuit 90 and to deadband control circuit 50. Thus, the output signal line 128 of summing circuit 124 can be expressed as being equal to I(t−1)−P(t)−D(t)−I(t), where P(t) is the proportional term signal of line 94 and D(t) is the derivative term signal of line 96.

Signal line 128 is coupled to a multiplier circuit 130. Also coupled to multiplier circuit 130 is a trim value carried by signal line 132, as shown. The trim value is a function of the vessel's characteristics such as hull shape and weight. For example, when autopilot 10 is used on a thirty-five foot, semi-displacement, single propeller vessel, the trim value is approximately 0.04 degrees of rudder per second. The output of multiplier 130 is carried by signal line 134 and represents the product of the signal of line 128 with the trim value. Signal line 134 is coupled to summing circuit 136, such circuit 136 also having the integral term signal line 92 coupled thereto, as mentioned. Thus, the integral term signal provided to summer 90 can be expressed as $I(t) = I(t-1) + \text{Trim Value} [I(t-1) - P(t) - D(t) - I(t)]$.

The roll term signal carried by line 98 to summing circuit 116 is provided as follows. Roll signal line 22, here provided by the roll sensor and processor unit 16 (FIG. 1), is coupled to an averaging circuit 146 and to a summing circuit 148, as, shown. Note that the roll signal of line 22 represents the instantaneous value of the angle of roll of the vessel. Averaging circuit 146 is used to average samples of the instantaneous roll signal provided thereto, here, over a two minute period. An output signal line 142 of averaging circuit 146, carrying the averaged roll signal, is also coupled to summing circuit 148. Summing circuit 148 subtracts the instantaneous roll signal of line 22 from the averaged roll signal of line 142 to provide a normalized roll signal carried by a signal line 150 to a multiplier 140. Also coupled to multiplier 140 is a roll gain value via a signal line 152, as shown. The value of roll gain may be manually entered and adjusted by the operator, or helmsmen of the autopilot 10. Alternatively, the value of roll gain may be adaptively, or automatically computed by autopilot 10. More particularly, such an adaptive roll gain value would be initially set at installation of the autopilot 10 as a function of the vessel's characteristic such as weight and hull shape and then, during operation, would be modified automatically from the installation value by multiplying such installation value by the velocity scheduling signal of line 20. In this way, the roll term signal will be increased as the speed of the boat is decreased (since the velocity scheduling signal is inversely proportional to the speed of the vessel). It may be further desirable to multiply the product of the roll gain value and the velocity scheduling signal by the roll frequency scheduling signal of line 114. In other words, since compensating for the roll of the vessel (i.e. as achieved by the roll term signal of line 98) is ineffective when heading into the seas, it may desirable to null the roll term signal by multiplying the roll gain value by the roll frequency scheduling signal of line 114. Since the value of the counter rudder signal is approximately one in beam sea conditions, the value of the roll term signal will be unaffected in such conditions.

Note that it is desirable to provide the course keeping signal as a function of the roll angle of the vessel since rolling of the vessel precedes deviation of the vessel from the desired course. In other words by compensating for the roll angle of the vessel, tighter course keeping is provided. It is desirable to use the magnitude of the roll angle in this capacity due to the simplicity of sensing the roll angle (i.e. with the clinometer as mentioned above). Stated differently, use of the roll angle to provide the course keeping signal effectively reduces the response time of the autopilot 10. Moreover, the magnitude of the roll angle is desirable since other representations of the vessel's roll, for example the derivative of the roll angle, tend to be noisy and thus introduce noise into the system.

Referring to FIGS. 1-3, it should be noted that the course change circuit 38 and the course keeping circuit 40 may be combined in the implementation of autopilot 10. In other words, here a separate implementation of circuits 38 and 40 is shown in FIGS. 1-3 in order to facilitate understanding of their operation. In particular, it is convenient to view the relationship between the error signal and the reference voltage (FIG. 1) in terms of selecting one or the other of circuits 38 and 40 to control the vessel's rudder. However, a combined implementation of circuits 38 and 40 is readily achieved since the proportional term signals associated with the course change circuit 38 and the course keeping circuit 40 (i.e. signal line 94 of FIG. 3 and signal line 80 of FIG. 2) are identical. Moreover, the derivative term signal of line 96 (FIG. 3) differs from the derivative term signal of line 84 (FIG. 2) only in the addition of the roll frequency scheduling signal of line 114 (FIG. 3). Additionally, during course change operation, the integral term signal of line 92 (FIG. 3) and the roll term signal of line 98 (FIG. 3) could be nulled if circuits 38 and 40 were combined in the implementation of autopilot 10.

Figure 4:
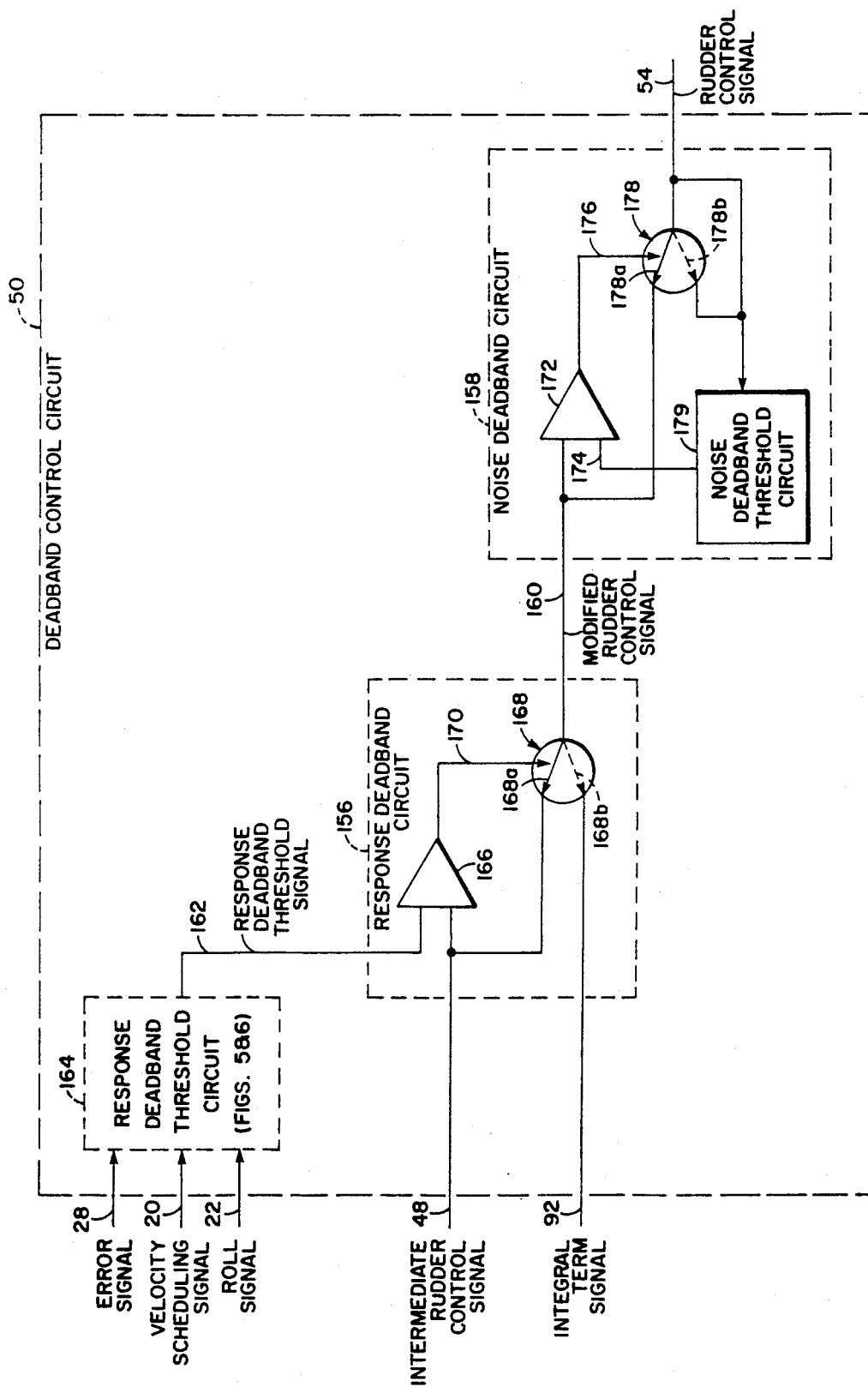
FIG. 4 is a block diagram of the deadband control circuit in accordance with the present invention.
Figure 5:
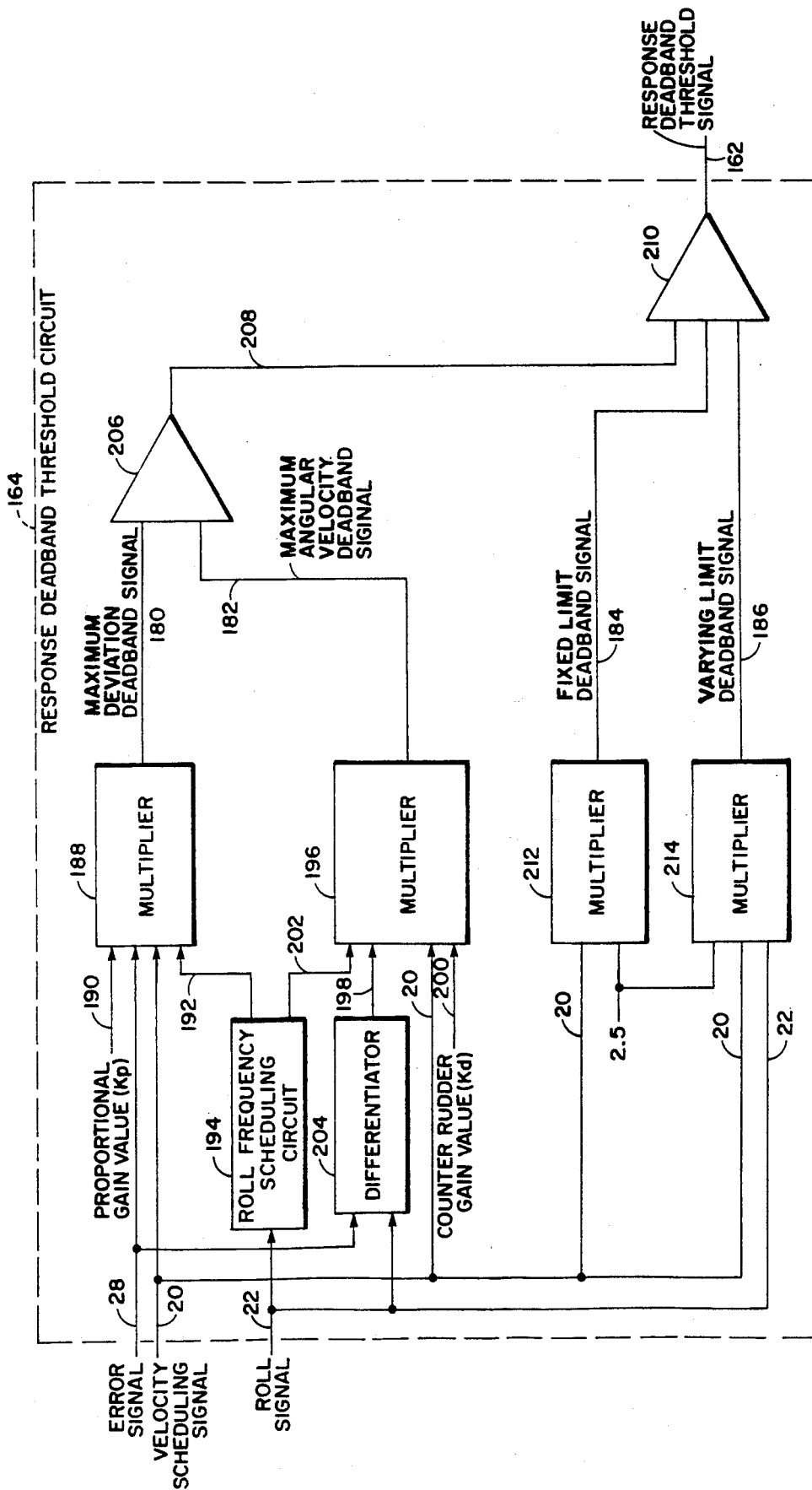
FIG. 5 is a is a block diagram of a deadband determination circuit.

Referring now to FIG. 4, a block diagram of deadband control circuit 50 (FIG. 1) is shown to include a response deadband circuit 156 and a noise deadband circuit 158. The rudder control signal of line 54 (FIG. 1) is provided at an output of the noise deadband circuit 158, as shown. Circuits 156 and 158 represent, generally, subsequent deadband procedures or operations by which the rudder control signal of line 54 is generated, as will now be described. Note that here, circuits 156 and 158 operate to update the rudder control signal of line 54 ten times per second.

The intermediate rudder control signal line 48 and the integral term signal line 92 are coupled to the response deadband circuit 156, as shown. Also coupled to the response deadband circuit 156 is a response deadband threshold signal carried by signal line 162. The response deadband threshold signal line 162 is generated by a response deadband threshold circuit 164, as shown and is updated once every thirty seconds. An output signal line 160 of response deadband circuit 156 is coupled to noise deadband circuit 158 and carries a signal hereinafter referred to as the modified rudder control signal.

More particularly, the response deadband threshold signal of line 162 is generated by circuit 164 in response the velocity scheduling signal line 20, the error signal line 28, and the roll signal line 22, such signal lines being coupled to inputs thereof. The way in which response deadband threshold circuit 164 generates the response deadband threshold signal will be described below in conjunction with FIGS. 5 and 6. Suffice it here to say that the response deadband threshold signal of line 162 represents a response deadband value, corresponding to a response deadband range used by the response deadband circuit 156 to generate the modified rudder control signal of line 160, as will now be described.

Referring now to the response deadband circuit 156, the response deadband threshold signal line 162 and the intermediate rudder control signal line 48 are coupled to inputs of a comparator circuit 166. The output signal line 170 of comparator circuit 166 is a logic signal provided in a first logic state when the intermediate rudder control signal is greater in value than the response deadband threshold signal. The logic signal of line 170 is provided in a second logic state when the intermediate rudder control signal is less than the response deadband threshold signal. More specifically, comparator circuit 166 more accurately represents a window comparator arrangement such that output signal 170 is in the first logic state when the intermediate rudder control signal is outside of the response deadband range and is in the second logic state if the intermediate rudder control signal is within the response deadband range. The response deadband range is a range centered about the value of the integral term signal and equal in magnitude to twice the value of the response deadband signal. In other words such response deadband range is defined by an upper response deadband limit and a lower response deadband limit, such limits separated by twice the value of the response deadband threshold signal of line 162. Logic signal line 170 is coupled to a switch 168 to provide such switch 168 in a first position 168a, as shown, when the logic signal of line 170 is in the first state and in a second position 168b when the logic signal of line 170 is in the second state.

Also coupled to switch 168 is the integral term signal line 92, the intermediate rudder control signal line 48, and the modified rudder control signal line 160, as shown. With this arrangement, when the intermediate rudder control signal exceeds, or is outside of, the response deadband range, the modified rudder control signal line 160 is coupled to the intermediate rudder control signal of line 48. Whereas, when the intermediate rudder control signal is within the response deadband range, the modified rudder control signal of line 160 is coupled to the integral term signal of line 92. In other words, the modified rudder control signal of line 160 is equal to the intermediate rudder control signal of line 48 when the intermediate rudder control signal exceeds the response deadband limits (i.e. is greater in magnitude than the response deadband threshold signal). However, the modified rudder control signal of line 160 is equal to the integral term signal of line 92 when the intermediate rudder control signal is within the response deadband limits (i.e. is smaller in magnitude than the response deadband threshold signal). Note that once the intermediate rudder control signal exceeds the response deadband limits, the modified rudder control signal is provided by the intermediate rudder control signal until such intermediate rudder control signal crosses the integral term signal and is within the response deadband limits. This arrangement ensures that the vessel will be brought back to the desired course when it is heading into the seas and the response deadband range is relatively large. These conditions will become more clear from the description of FIG. 7 below.

It is desirable to provide the modified rudder control signal of line 160 in accordance with the response deadband threshold signal of line 162 as described above since, in certain conditions, rudder movement is ineffectual in maintaining or keeping the vessel on the desired course. More particularly, when the vessel is heading into the direction of the waves, the perturbations in the vessel's heading will occur at a relatively high frequency. In fact, the frequencies of such perturbations tend to be so high that the rudder 61 cannot move fast enough to compensate for them. Thus, a signal directing the movement of the rudder's position in response to such perturbations will be ineffectual in maintaining the vessel on the desired course. Moreover, the movement of the rudder 61 in response to such a signal will result in unnecessary wear on the rudder 61 and associated drive apparatus. Response deadband circuit 156 sets the modified rudder control signal of line 160 equal to the intermediate rudder control signal of line 48 when the conditions are such that the rudder 61 can effectively respond to the intermediate rudder control signal of line 48 in order to maintain the desired course. However, when conditions are such that the rudder 61 cannot effectively respond to the intermediate rudder control signal of line 48 in order to maintain the desired course, circuit 156 sets the modified rudder control signal of line 160 equal to the integral term signal of line 92.

Having the modified rudder control signal of line 160 equal to the integral term signal of line 92 when the rudder 61 cannot compensate for perturbations in the vessel's heading provides improved short-term course keeping capability. More particularly, the integral term signal compensates for low frequency disturbances in the vessel's heading, such as wind. Thus, by having the modified rudder control signal equal the integral term signal, such low frequency disturbances will be compensated in conditions where the rudder 61 cannot effectively compensate for heading disturbances. In other words, if the modified rudder control signal was held constant when the value of such signal is within the response deadband range, a small heading deviation may exist for a relatively long period of time before the disturbance becomes large enough to force the intermediate rudder control signal outside of the response deadband range. In contrast, in the present system in which the modified rudder control signal is equal to the integral term signal when the intermediate rudder control signal is within the response deadband range, such low frequency disturbances are continuously compensated. This arrangement ensures that the vessel will remain on course when subjected to low frequency disturbances, even when the response deadband is relatively large.

As mentioned, modified rudder control signal 160 is coupled to the noise deadband circuit 158. The noise deadband circuit 158 operates on the modified rudder control signal to provide the rudder control signal of line 54. More particularly, signal line 160 is coupled to an input of a comparator circuit 172. Also coupled to an input of comparator circuit 172 is a noise deadband threshold signal carried by signal line 174. The noise deadband threshold signal corresponds to a noise deadband value, or limit which is set during the installation of autopilot 10. In other words, here, the noise deadband threshold signal has a constant value. Here, the noise deadband value is approximately 0.25. However, the noise deadband range thus provided (i.e. a range equal to twice the value of the noise deadband threshold signal) is scaled up or down as a function of the rudder control signal of line 54, as will be described. In other words, the noise deadband range is defined by an upper noise deadband limit and a lower noise deadband limit.

The output of comparator circuit 172, here representing a window comparator arrangement, is a logic signal carried by signal line 176 and coupled to a switch 178 for controlling the position thereof. More particularly, the logic signal of line 176 is provided in a first logic state when the modified rudder control signal exceeds, or is outside of, the noise deadband range. Such logic signal is in a second logic state when the modified rudder control signal is within the noise deadband range. In response to signal line 176, switch 178 is disposed in a first position 178a or in a second position 178b to provide the rudder control signal of line 54.

More particularly, the rudder control signal line 54 is coupled to an output of switch 178 and is also fed back to an input of switch 178, such input being further coupled to a noise deadband threshold circuit 179 as shown. Also coupled to an input of switch 178 is the modified rudder control signal line 160. The noise deadband threshold circuit 179 scales the noise deadband range up or down in accordance with the rudder control signal. More particularly, circuit 179 scales the noise deadband range up or down in order to center such range around the rudder control signal of line 54, as will become more clear in conjunction with the description of FIG. 7 below. With noise deadband circuit 158 as described, when switch 178 is in the first position 178a, the rudder control signal of line 54 is equal to the modified rudder control signal of line 160 minus the value of the noise deadband threshold signal. When switch 178 is in the second position 178b, the rudder control signal is maintained constant.

One purpose of noise deadband circuit 158 is to minimize rudder activity caused by noise, such noise being introduced by the heading sensor and processor unit 12 (FIG. 1), the speed sensor and processor unit 14 (FIG. 1), and the roll sensor and processor unit 16 (FIG. 1). Another purpose of the noise deadband circuit 158 is to compensate for inaccuries due to mechanical restraints and caused by the motor controller 56 (FIG. 1). Generally, the noise deadband range is significantly smaller than the response deadband range as will become apparent from the description of FIG. 7 below. It should be appreciated however that due to the course keeping accuracy realized with the use of the response deadband operation, and further in view of advances in heading detection, in certain applications it may be suitable to eliminate the noise deadband operation Referring now to FIG. 5, the response deadband threshold circuit 164 provides the response deadband threshold signal of line 162 at an output thereof, as shown, in response to the velocity scheduling signal of line 20, the error signal line 28, and the roll signal line 22. More particularly, once every thirty seconds, four different deadband values are computed by response deadband threshold circuit 164. These deadband value signals are carried by a MAXIMUM DEVIATION deadband signal line 180, a MAXIMUM ANGULAR VELOCITY deadband signal line 182, a FIXED LIMIT deadband signal line 184, and a VARYING LIMIT deadband signal line 186. Before discussing the way in which these four deadband signals are used to provide the response deadband threshold signal of line 162, the computation of each of the deadband signals will now be described.

The MAXIMUM DEVIATION deadband signal of line 180 is provided at an output of a multiplier 188, as shown. More particularly, the MAXIMUM DEVIATION deadband signal is equivalent to the product of the proportional gain value $K_p$ carried by signal line 190, the error signal (or average yaw amplitude) carried by signal line 28, the velocity scheduling signal carried by signal line 20, and a signal related to the roll frequency of the vessel and carried by signal line 192. The proportional gain value $K_p$ is as described above in conjunction with the course change circuit 38 of FIG. 2 and the course keeping circuit 40 of FIG. 3. The error signal input to multiplier 188 provides a representation of the vessel's yaw amplitude. Here, the error signal is averaged to provide an average value of yaw amplitude. The velocity scheduling signal of line 20 is as described above in conjunction with FIGS. 1-4. The signal carried by line 192 may be referred to as a roll frequency scheduling signal and is related to the roll signal of line 22 as will now be described.

Roll signal line 22 is coupled to a roll frequency scheduling circuit 194, like circuit 112 (FIG. 3). More particularly, signal line 192 is provided at an output of the roll frequency scheduling circuit 194 and is related to the roll signal of line 22 by a look-up table arrangement. When the vessel is in following seas, the roll frequency of the vessel is relatively low. In such conditions, the roll frequency scheduling signal of line 192 is set to zero. More particularly, a value of roll frequency less than approximately 0.25 Hertz corresponds to a zero value of the roll frequency scheduling signal of line 192. In this way, the MAXIMUM DEVIATION deadband signal of line 180 is nulled, or set equal to zero, in such following sea conditions. When the vessel is heading into the seas, the roll frequency thereof is relatively high. In these conditions, and more particularly, when the vessel's roll frequency to above approximately 0.45 Hertz, the roll frequency scheduling signal of line 192 is set to a value of approximately one. In this way, when the vessel is heading into the waves, the MAXIMUM DEVIATION deadband signal of line 180 is equal to the product of the proportional gain value $K_p$, the error signal, and the velocity scheduling signal. Moreover, here linear interpolation is used to provide the value of the roll frequency scheduling signal for roll frequencies between 0.25 Hertz and 0.45 Hertz.

The MAXIMUM ANGULAR VELOCITY deadband signal of line 182 is provided at an output of a multiplier circuit 196. More particularly, the MAXIMUM ANGULAR VELOCITY deadband signal is equal to the product of a roll frequency scheduling signal carried by line 202, an angular velocity signal of line 198, the velocity scheduling signal of line 20, and the counter rudder gain value $K_d$ carried by signal line 200. Here, the roll frequency scheduling signal of line 202 is equal to the square of the value of the roll frequency scheduling signal of line 192. The angular velocity signal of line 198 is provided at an output of a differentiator 204, as shown. Differentiator 204 is fed by the error signal line 28 and the roll signal line 22. As above, the error signal line 28 provides a signal corresponding to the vessel's yaw amplitude. A signal having an amplitude equivalent to the vessel's yaw amplitude and a frequency equivalent to the vessel's roll frequency is differentiated by differentiator 204 to provide the angular velocity signal of line 198. The counter rudder value $K_d$ provided to multiplier 196 by signal line 200 is the same as that described above in conjunction with FIGS. 2 and 3.

With this arrangement, when the roll frequency scheduling signal of line 202 has a value of zero (i.e. when the vessel is heading into the seas), the MAXIMUM ANGULAR VELOCITY deadband signal of line 182 is zero. On the other hand, when the roll frequency scheduling signal of line 202 has a value of one (i.e. when the vessel is in following seas), the MAXIMUM ANGULAR VELOCITY deadband signal of line 182 is equal to the product of the angular velocity signal of line 198, the velocity scheduling signal of line 20, and the counter rudder gain value $K_d$ carried by signal line 200.

MAXIMUM DEVIATION deadband signal line 180 and MAXIMUM ANGULAR VELOCITY deadband signal line 182 are coupled to inputs of a comparator circuit 206, as shown. In response to the signals carried by lines 180 and 182, comparator circuit 206 selects the larger (i.e. greater magnitude) of the MAXIMUM DEVIATION deadband signal and the MAXIMUM ANGULAR VELOCITY deadband signal to provide an output signal carried by signal line 208. Output signal line 208 is coupled to an input of a second comparator circuit 210 as shown, the output of which provides the response deadband threshold signal of line 162. Also, coupled to inputs of comparator circuit 210 are the FIXED LIMIT deadband signal line 184 and the VARYING LIMIT deadband signal line 186.

The FIXED LIMIT deadband signal is provided at an output of a multiplier circuit 212, as shown. More particularly, multiplier 212 is fed by the velocity scheduling signal line 20 and multiplies such signal by a constant value of 2.5 degrees rudder to provide the FIXED LIMIT deadband signal. Thus, the FIXED LIMIT deadband signal is proportional to the velocity scheduling signal, which in turn is inversely proportional to the speed of the vessel, as described above in conjunction with FIG. 1.

The VARYING LIMIT deadband signal of line 186 is provided at an output of a multiplier circuit 214, as shown. The inputs of multiplier circuit 214 ar provided by the velocity scheduling signal line 20 and the roll signal line 22. The VARYING LIMIT deadband signal is computed by multiplier 214 as the product of the velocity scheduling signal, the roll signal, and a constant value of 2.5 degrees rudder. Here, the value of the VARYING LIMIT deadband signal is varied in accordance with the time during which the intermediate rudder control signal of line 48 exceeds the response deadband range. More particularly, the VARYING LIMIT deadband signal is decreased if the time during which the intermediate rudder control signal of line 48 is outside of the response deadband range exceeds the reciprocal of the roll frequency of the vessel. With this arrangement, the VARYING LIMIT deadband signal is decreased if the vessel does not travel through the desired course during each roll cycle. Further, such value is increased if this time, during which the intermediate rudder control signal of line 48 is outside of the response deadband range, is less than the reciprocal of, here, approximately four times the roll frequency. In other words, this condition of the value of the intermediate rudder control signal being outside of the response deadband range for a time less than the reciprocal of four times the roll frequency, indicates over use of the rudder 61. Stated differently, such condition indicates that the rudder 61 is being moved to attempt to compensate for relatively high frequency disturbances which, in fact, the rudder 61 cannot effectively compensate. Thus, with this arrangement, VARYING LIMIT deadband signal will be increased and, in the case where such VARYING LIMIT deadband signal provides the response deadband signal, the response deadband limits are concomitantly increased.

As mentioned above, signal lines 184, 186, and 208 are coupled to inputs of comparator circuit 210 to provide the response deadband threshold signal of line 162. More particularly, comparator circuit 210 compares the relative levels of the signals carried by lines 184, 186, and 208 and selects the signal of line 208 to provide the response deadband threshold signal unless such signal has a greater value than either of the limit deadband signals of line 184 or 186. In the case where the signal of line 208 is greater than either the FIXED LIMIT deadband signal of line 184 or the VARYING LIMIT deadband signal of line 186, comparator circuit 210 selects the smaller of these limit deadband signals (i.e. from signal line 184 or 186) to provide the response deadband threshold signal of line 162.

With this arrangement, the response deadband threshold signal is a function of either the permissible MAXIMUM DEVIATION of the vessel from its desired course (i.e. when the MAXIMUM DEVIATION deadband signal is greater in value than the MAXIMUM ANGULAR VELOCITY signal and less than both the FIXED LIMIT signal and the VARYING LIMIT signal) or the permissible MAXIMUM ANGULAR VELOCITY of the vessel (i.e. when the MAXIMUM ANGULAR VELOCITY deadband signal is greater in value than the MAXIMUM DEVIATION deadband signal and less than both the FIXED LIMIT signal and the VARYING LIMIT signal). However, if the greater of the deadband signals of lines 180 and 182 is greater than either of the limit deadband signals of lines 184 and 186, the response deadband threshold signal is provided by the limit deadband signal having the smaller value.

Figure 6:
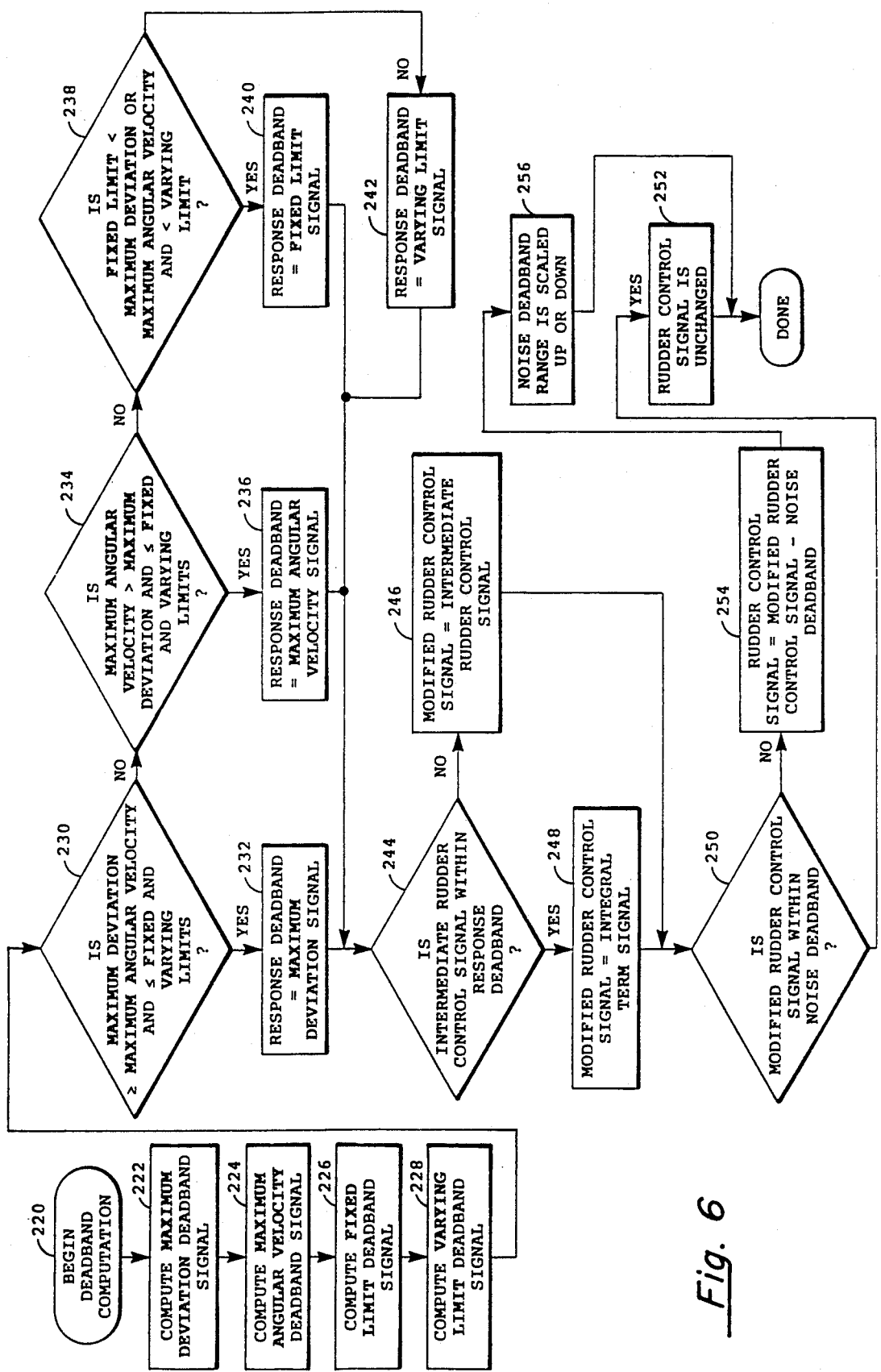
FIG. 6 simplified flow diagram of the adaptive deadband feature of the present invention.

Referring now to FIG. 6, the operation of response deadband threshold circuit 164 will be further described in conjunction with process steps as may be realized with a computer and a suitable software program. Step 220 represents the beginning of a deadband computation. More particularly, step 220 is executed once every thirty seconds. In subsequent process step 222, the MAXIMUM DEVIATION deadband signal of line 180 is computed, as described above in conjunction with FIG. 5. More particularly, the MAXIMUM DEVIATION deadband signal is provided by multiplying the proportional gain value $K_p$, the error signal, the velocity scheduling signal, and the roll related signal. The MAXIMUM ANGULAR VELOCITY deadband signal is computed in step 224, again as described above. In step 226, the FIXED LIMIT deadband signal is computed by multiplying the velocity scheduling signal of line 20 by a constant value of 2.5 degrees rudder, as described above. Similarly, in step 228 the VARYING LIMIT deadband signal is computed, as described above.

Subsequently, in step 230, it is determined whether the MAXIMUM DEVIATION signal is greater than or equal to the MAXIMUM ANGULAR VELOCITY signal and less than or equal to both the FIXED and VARYING LIMIT deadband signals. In other words, such determination is as described above in conjunction with comparator circuits 206 and 210 of FIG. 5. In the case where such determination is affirmative, the response deadband threshold signal is set equal to the MAXIMUM DEVIATION signal in step 232. However, if the MAXIMUM DEVIATION signal is not greater than or equal to the MAXIMUM ANGULAR VELOCITY signal and less than the FIXED and VARYING LIMIT signals, step 234 is next executed in which it is determined whether the MAXIMUM ANGULAR VELOCITY signal is greater than the MAXIMUM DEVIATION signal and less than or equal to both the FIXED and VARYING LIMIT signals. If the determination in step 234 is affirmative, step 236 is next executed in which the response deadband threshold signal is set equal to the MAXIMUM ANGULAR VELOCITY signal. Whereas, in the case where the MAXIMUM ANGULAR VELOCITY signal is not greater than the MAXIMUM DEVIATION signal and is not less than or equal to both the FIXED and VARYING LIMIT signals, step 238 is next executed, as shown. In step 238, it is determined whether the FIXED LIMIT signal is less than the MAXIMUM DEVIATION signal or the MAXIMUM ANGULAR VELOCITY signal and is less than the VARYING LIMIT signal. If such determination is affirmative, step 240 is next executed in which the response deadband threshold signal is set equal to the FIXED LIMIT signal. However, if the determination of step 238 is negative, step 242 is next executed in which the response deadband threshold signal is set equal to the VARYING LIMIT signal.

Subsequent to steps 232, 236, 240, and 242, step 244 is executed in which it is determined whether the intermediate rudder control signal of signal line 48 is within the response deadband range. More particularly, step 244 represents the functionality of the response deadband circuit 156 (FIG. 4) Consider first the case where the intermediate rudder control signal is not within, but exceeds the response deadband range. In this case, step 246 is next executed in which the modified rudder control signal of line 160 (FIG. 4) is provided by, or set equal to the intermediate rudder control signal of line 48. If, however, the intermediate rudder control signal is determined to be inside of the response deadband range in step 244, step 248 is next executed in which the modified rudder control signal is set equal to the integral term signal of line 92 (FIG. 4).

Subsequent to steps 246 and 248, step 250 is executed, such step representing the functionality of the noise deadband circuit 158 (FIG. 4). If it is determined, in step 250, that the modified rudder control signal is within the noise deadband range, step 252 is next executed in which the rudder control signal of line 54 (FIG. 4) is held, or maintained, constant. If, however, it is determined in step 250 that the modified rudder control signal is not within the noise deadband range, step 254 is next executed in which the rudder control signal of line 54 is provided by, or set equal to the modified rudder control signal of line 160 minus the value of the noise deadband threshold signal, as will become more clear from the description of FIG. 7 below. Subsequent to step 254, step 256 is executed in which the noise deadband range is scaled up or down in accordance with the rudder control signal by the noise deadband threshold circuit 179 (FIG. 4). Subsequent to steps 252 and 256, a deadban computation is cycle completed.

Figure 7:
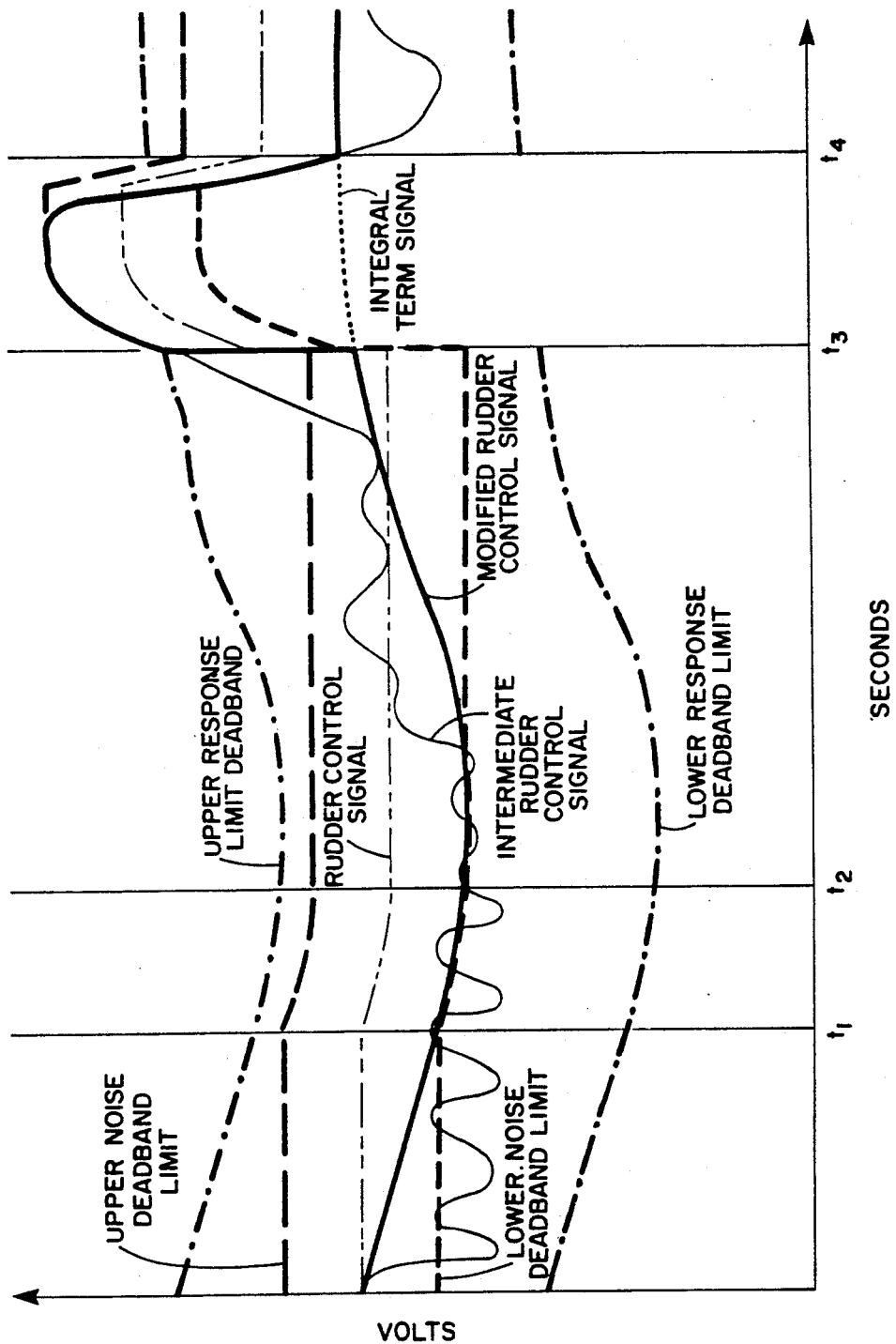
FIG. 7 is a sketch of a rudder order signal and the corresponding rudder control signal in accordance with the adaptive deadband feature of the present invention.

Referring now to FIG. 7, and also to FIG. 4, the operation of deadband control circuit 50 will become more clear. FIG. 7 shows the relationship between the response deadband range (i.e. corresponding to the response deadband threshold signal of line 162 and defined by the upper response deadband limit and the lower response deadband limit) and the noise deadband range (corresponding to the noise deadband threshold signal carried by signal line 174 and defined by the upper noise deadband limit and the lower noise deadband limit). Also shown on FIG. 7 is the intermediate rudder control signal of line 48, the modified rudder control signal of line 160, and the rudder control signal of line 54.

Referring first to the time period before time $t_1$, it can be seen that the intermediate rudder control signal is within the response deadband range, or limits. Thus, as is apparent from the above description of the response deadband circuit 156, the modified rudder control signal of line 160 is set equal to the integral term signal of line 92. In other words, this condition corresponds to switch 168 of response deadband circuit 156 (FIG. 4) being in position 168b. Also before time $t_1$, the modified rudder control signal is within the noise deadband limits. From the above description of the noise deadband circuit 158 prior to such time $t_1$, the rudder control signal of line 54 is held constant, as shown. In other words, this condition corresponds to switch 178 (FIG. 4) of noise deadband circuit 158 being in position 178b.

Consider next the time between $t_1$ and $t_2$. The intermediate rudder control signal is still within the response deadband limits, and thus, the modified rudder control signal is still provided by the integral term signal. However, at time $t_1$, the modified rudder control signal intersects the lower noise deadband limit. As is apparent from the above description of noise deadband circuit 158 (FIG. 4) and process steps 250-256 (FIG. 6), after time $t_1$, the rudder control signal is set equal to the modified rudder control signal minus the value of the noise deadband threshold signal. Moreover, after time $t_1$, the noise deadband range is scaled down, as shown to center such range around the rudder control signal. At time $t_2$, the modified rudder control signal has reached a minimum and thus, the noise deadband range is held constant thereafter.

The time period between $t_2$ and $t_3$ is like that before time $t_1$. In other words, the intermediate rudder control signal is within the response deadband limits, and thus the modified rudder control signal is equal to the integral term signal. Moreover, the modified rudder control signal is within the noise deadband limits and thus, the rudder control signal is held constant$_2$ as shown.

Consider next the intermediate rudder control signal at time $t_3$ when such signal exceeds the upper response deadband limit. Thereafter, the modified rudder control signal is set equal to the intermediate rudder control signal (i.e. switch 168 of FIG. 4 is in position 168a). Also at time $t_3$, the modified rudder control signal exceeds the upper noise deadband limit and thus the rudder control signal is provided by the modified rudder control signal minus the value of the noise deadband threshold signal. Note that the modified rudder control signal will continue to be provided by the intermediate rudder control signal until the intermediate rudder control signal crosses over, or intersects, the integral term signal and is within the response deadband limits (i.e. as occurs at time $t_4$). Thus, at time $t_4$, the modified rudder control signal is again provided by the integral term signal of line 92 and the response deadband limits are reestablished, as shown. Moreover, the modified rudder control signal has reached a minimum and thus, the noise deadband range is thereafter held constant.

Having described preferred embodiments of the invention, it should now become evident to one of skill in the art that other embodiments incorporating its concepts may be used. For example, note that wherever the above description has referred to a rudder of a marine vessel, any suitable steering mechanism may be substituted therefor. For example, it may be desirable to apply the circuitry and description provided above to an airplane in which the steering mechanism is the airplane's rudder. It is felt, therefore, that this invention should not be restricted to the disclosed embodiments, but rather should be limited only by the spirit and scope of the appended claims.

What is claimed is:

1. A marine autopilot for use on a vessel having a rudder and a source of an actual vessel heading signal, said autopilot comprising:
   operator actuable control means for providing a signal corresponding to a desired course for said vessel;
   course keeping means for generating a course keeping signal to maintain said vessel on the desired course;
   means coupled to the vessel for sensing the frequency of the roll of the vessel and for generating a roll frequency scheduling signal; and
   means for adjusting said course keeping signal in response to said roll frequency scheduling signal.

2. The marine autopilot recited in claim 1 wherein said autopilot further comprises means coupled to said actual vessel heading signal source and said operator actuable control means for generating an error signal corresponding to the difference between said desired course and said actual vessel heading and wherein the course keeping means comprises:
   means fed by said error signal for generating a first signal proportional to said error signal;
   means fed by said error signal and including a differentiator for generating a second signal related to the time rate of change of said error signal;
   means including an integrator for generating a third signal related to the time integral of said error signal; and
   means for summing the first, second, and third signals to provide said course keeping signal.

3. The marine autopilot recited in claim 2 wherein the means for adjusting the course keeping signal includes means for increasing said course keeping signal in response to the roll frequency being above a predetermined threshold value; and
   means for decreasing said course keeping signal in response to the roll frequency being below said predetermined threshold value.

4. The marine autopilot recited in claim 3 wherein the means for adjusting said course keeping signal is coupled to said second signal generating means.

* * * * *